Dec. 2, 1930.                P. F. McGOVERN                1,783,664
                             SHAFTING FOR ENGINES
                             Filed March 26, 1929

Inventor
Peter F. McGovern
By Seymour & Bright
Attorneys

Patented Dec. 2, 1930

1,783,664

UNITED STATES PATENT OFFICE

PETER F. McGOVERN, OF WEEHAWKEN, NEW JERSEY

SHAFTING FOR ENGINES

Application filed March 26, 1929. Serial No. 350,038.

This invention relates to improvements in shafting for engines, and more particularly to novel counter-weight means for use with the shafting of automobile engines.

The primary object of the invention is to provide means to balance an automobile engine at all speeds, under power or otherwise.

A further object is to provide the engine crank shaft at its opposite ends with opposed counter-weights for the purpose of balancing the engine at all times.

A further object is to furnish an automotive engine in which the crank shaft is provided at its ends with opposed counter-weights, each of which extends substantially 180 degrees circumferentially of a disk carried by the respective ends of the shaft.

With the foregoing objects outlined and with other objects in view which will appear as the description proceeds, my invention consists in the novel features hereinafter described in detail, illustrated in the accompanying drawing, and more particularly pointed out in the appended claim.

Referring to the drawing.

Figure 1:
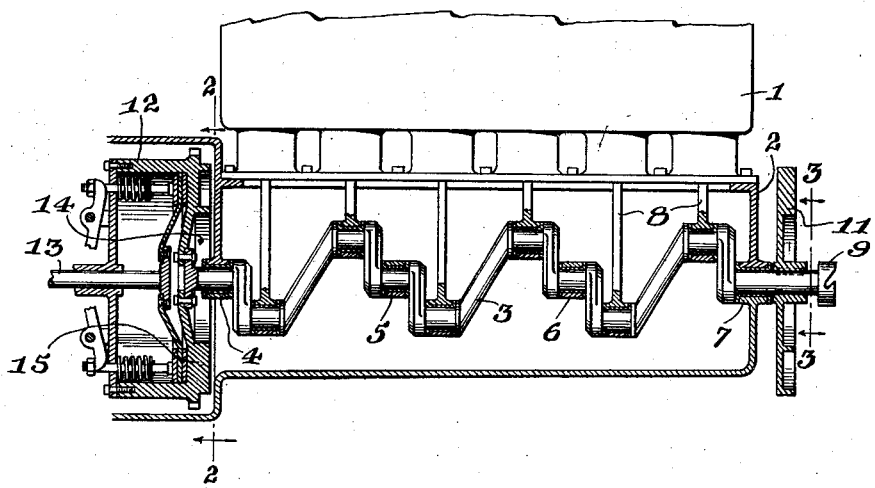
Figure 1 is an elevation, partly in vertical section of an automobile engine and the clutch which connects its crank shaft to the clutch shaft.
Figure 2:
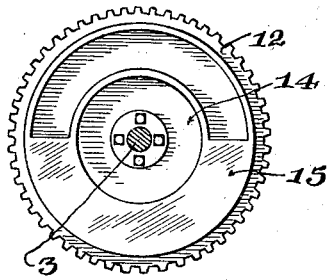
Figure 2 is a transverse vertical sectional view on the line 2—2 of Fig. 1.

In the drawing, 1 indicates an automotive engine cylinder block, and 2 the crank case of the same. The conventional crank shaft is shown at 3, and it is mounted in bearings 4, 5, 6 and 7. Pistons, (not shown) are connected to the crank shaft by means of connecting rods 8.

Figure 3:
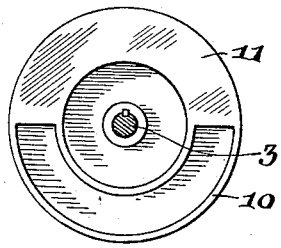
Figure 3 is a similar view on the line 3—3 of Fig. 1.

As is usual in automotive engines, the front end of the crank shaft extends forwardly of the crank case, and is provided with a crank receiving clutch member 9, and as a part of my present invention, a circular disk 10 is fixedly mounted on the forwardly projecting portion of the shaft. As best shown in Fig. 3, this disk carries an arc-shaped counter-balance weight 11, which extends circumferentially substantially 180 degrees.

A clutch 12 is used for connecting the crank shaft to a clutch shaft 13, and this clutch may be of any conventional construction. As another part of my invention, I fixedly mount upon the fly-wheel 14 of the crank-shaft, a counter-weight 15, which preferably extends circumferentially substantially 180 degrees.

Each wheel 10, 14 and its counter-balance weight is preferably formed as a one-piece casting and the weights are of equal mass and length; and when an automotive engine is provided with a structure of this character, the engine will be balanced at all speeds, under power or otherwise.

From the foregoing it is believed that the construction, operation and advantages of my invention may be readily understood, and I am aware that changes may be made in the details disclosed, without departing from the spirit of the invention, as expressed in the claim.

Having full described my invention, what I claim as new and desire to secure by Letters Patent, is:—

In an automotive engine, a crank shaft, a series of cylinders arranged at one side of said shaft, a series of piston rods connected to the crank shaft and extending into said cylinders, a fly-wheel rigidly connected to one end of said shaft, a disk of substantially the same diameter as the fly-wheel, fixedly mounted on the other end of the shaft, and oppositely disposed counter-weights mounted respectively on said fly-wheel and on said disk, each counter-weight being of arc-shape and extending circumferentially substantially 180 degrees only.

In testimony whereof, I have signed this specification.

PETER F. McGOVERN.